No. 815,524. PATENTED MAR. 20, 1906.
J. E. GLENN.
NUT LOCK.
APPLICATION FILED JULY 24, 1905.

Inventor
J. E. Glenn,

Witnesses
Louis C. Stark
Herbert D. Lawson

By W. T. FitzGerald & Co.,
Attorneys ced.

UNITED STATES PATENT OFFICE.

JOSEPH E. GLENN, OF DOTY, WASHINGTON.

NUT-LOCK.

No. 815,524.     Specification of Letters Patent.     Patented March 20, 1906.

Application filed July 24, 1905. Serial No. 271,047.

*To all whom it may concern:*

Be it known that I, JOSEPH E. GLENN, a citizen of the United States, residing at Doty, in the county of Lewis and State of Washington, have invented certain new and useful Improvements in Nut-Locks; and I do hereby declare the following to be a full, clear, and exact description of the invention, such as will enable others skilled in the art to which it appertains to make and use the same.

My invention relates to nut-locks; and its object is to provide a device of this character which is of simple construction and which will hold a nut securely in place upon a bolt and prevent it from becoming loosened or accidentally detached.

Another object is to provide a lock which can be applied at either quarter-turn of the nut upon the bolt.

With the above and other objects in view the invention consists of a nut having a transversely-extending dovetail groove which is adapted to register with either of two intersecting grooves formed in the end of the bolt. A locking-strip having an enlarged head is adapted to be inserted into the dovetail groove of the nut and to be pressed into either of the grooves in the bolt. This locking-strip is provided at its center with lateral extensions whereby the central portions of both grooves in the bolt will be engaged by the strip.

The invention also consists of other novel features of construction and combination of parts hereinafter more fully described, and pointed out in the claims.

In the accompanying drawings I have shown the preferred form of my invention.

Figure 1:
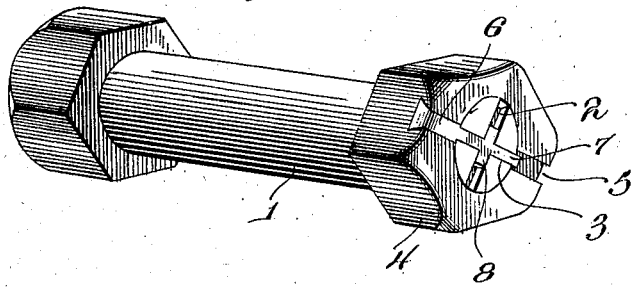
Figure 2:
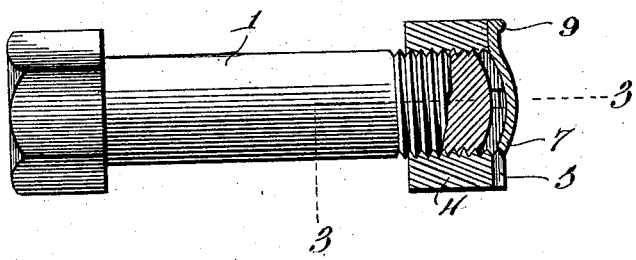
Figure 3:
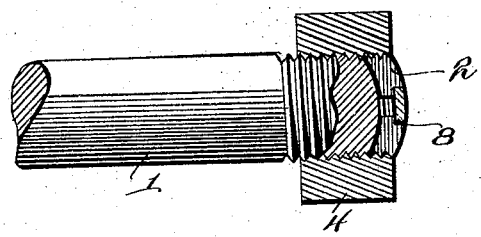
Figure 4:
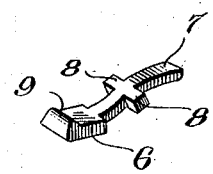

In said drawings, Figure 1 is a perspective view showing a nut and bolt having my improved lock applied thereto. Fig. 2 is a side elevation of the bolt and showing the nut thereof in section. Fig. 3 is a section on line 3 3, Fig. 2; and Fig. 4 is a detail view of the locking-strip.

Referring to the figures by numerals of reference, 1 is a bolt of any suitable material and proportions and having in its threaded end intersecting grooves 2 and 3, which are of the same proportions and extend any desired distances into the bolt. A nut 4 is adapted to engage the bolt and has a transversely-extending dovetail groove 5 in its outer face, which is adapted after each quarter-turn of the nut to register with each of the grooves 2 and 3. The nut-groove 5 is adapted to receive a locking-strip of peculiar construction. This strip, as shown in Fig. 4, consists of a head 6, having beveled sides adapted to be inserted into and fit snugly within the dovetail groove 5. An extension 7 projects from the head 6 and has lateral arms 8 at the center thereof, said extension and arms being equal in width to the width of grooves 2 and 3. A lug or bead 9 is formed at the outer end of head 6 and is adapted to be engaged by the end of the finger, so as to permit the strip to be readily put into or out of place. The entire strip is formed of malleable metal, and therefore when it is desired to lock a nut upon a bolt it is merely necessary to turn the nut until the groove 5 registers with one of the grooves 2 and 3. The head 6 is then inserted into one end of groove 5 and strip 7 and arms 8 are bent into the grooves 2 and 3, thereby holding the nut and bolt against independent movement. If it is desired to detach the nut, it is first necessary to bend the strip 7 out of the grooves 2 and 3. Head 9 can then be slid from groove 5, if desired.

It will be seen that this device is very simple and inexpensive in construction and constitutes a strong lock for holding a nut in adjusted position upon a bolt. Nuts and bolts of ordinary construction can be readily grooved to receive the locking-strip.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. The combination with a bolt having grooves in one end; of a nut having a transversely-extending dovetail groove in one face, and a locking-strip detachably mounted within the groove in the nut and comprising a head and an extension thereof having lateral projecting arms, said arms and extension being adapted to be seated in the grooves in the bolt.

2. The combination with a bolt having intersecting grooves in one end; of a nut having a dovetail groove in one face adapted to register with either of the bolt-grooves, and a locking-strip detachably seated within the groove in the nut and engaging the walls of said groove, said strip comprising a head having a lug thereon, an extension, and laterally-projecting arms on the extension.

3. The combination with a nut having a transversely-extending dovetail groove in one face thereof; a locking-strip detachably mounted within and engaging the walls of the groove, said strip comprising a head having a projecting portion thereon, an extension and laterally-projecting arms on the extension and a bolt having a groove in one end adapted to receive the locking-strip.

In testimony whereof I have signed my name to this specification in the presence of two subscribing witnesses.

JOSEPH E. GLENN.

Witnesses:
WM. SPEAKER,
J. C. OSBORNE.